United States Patent [19]

Nakagawa

[11] Patent Number: 4,669,557

[45] Date of Patent: Jun. 2, 1987

[54] WEIGHING APPARATUS

[75] Inventor: Yukio Nakagawa, Kyoto, Japan

[73] Assignee: Ishida Scales Mfg. Co., Ltd., Kyoto, Japan

[21] Appl. No.: 764,193

[22] Filed: Aug. 9, 1985

[30] Foreign Application Priority Data

Aug. 9, 1984 [JP] Japan ................... 59-166685
Aug. 9, 1984 [JP] Japan ................... 59-166686
Aug. 9, 1984 [JP] Japan ................... 59-166687
Aug. 9, 1984 [JP] Japan ................... 59-166688

[51] Int. Cl.$^4$ .................... G01G 19/22; G01G 13/02; G01G 13/14
[52] U.S. Cl. .................... 177/25; 177/123; 177/165
[58] Field of Search .................... 177/25, 165, 123

[56] References Cited

U.S. PATENT DOCUMENTS

| 4,143,725 | 3/1979 | Gaubert ................... 177/123 |
| 4,313,507 | 2/1982 | Hays . |
| 4,465,149 | 8/1984 | Kawashima et al. ........... 177/165 X |
| 4,494,619 | 1/1985 | Matsuno .................... 177/123 X |
| 4,549,619 | 10/1985 | Fujiwara ................... 177/25 |

FOREIGN PATENT DOCUMENTS

| 0079237 | 11/1982 | European Pat. Off. . |
| 0097532 | 6/1983 | European Pat. Off. . |
| 0097531 | 6/1983 | European Pat. Off. . |
| 0114745 | 1/1984 | European Pat. Off. . |
| 2399012 | 7/1978 | France . |
| 2097207 | 9/1981 | United Kingdom . |

Primary Examiner—George H. Miller, Jr.
Attorney, Agent, or Firm—Staas & Halsey

[57] ABSTRACT

A weighing apparatus for weighing elongate articles such as spaghetti strings or macaroni tubes, for example, includes a primary weighing machine for measuring the weight of articles to within a preset target weight, a plurality of secondary weighing machines for measuring a weight shortage with respect to the preset target weight which is the difference between the preset target weight and the weight measured by the primary weighing machine, a control unit for effecting a combinatorial weighing operation on the weights from the secondary weighing machines with the shortage employed as a combinatorial target weight to select one weight combination which is equal to the combinatorial target weight or closest thereto within an allowable range, and a combining unit such as a packaging machine for combining articles discharged from the primary weighing machine and those secondary weighing machines which give the weight combination. The weighing apparatus automatically weighs the elongate articles highly efficiently. A primary supply device may include a pair of primary weighing machines, and a secondary supplying device may include a plurality of pairs of secondary weighing machines.

12 Claims, 8 Drawing Figures

PRIMARY WEIGHT MEMORY PM

(A)

PROPER/FAILURE FLAG MEMORY (B)

TIMING HOPPER    BUCKET CONVEYOR    DISTRIBUTION HOPPER (C)  DISCHARGE OCCURRENCE COUNTER MEMORY (D)  DISCHARGE OCCURRENCE COUNTER MEMORY (E)  DISCHARGING SECONDARY WEIGHING MACHINE TOTALING MEMORY (F)  PRIMARY SUPPLY CHANGE FLAG

WEIGHING APPARATUS

BACKGROUND OF THE INVENTION

The present invention relates to a weighing apparatus for weighing elongate articles such as dried noodle strings, for example.

Figure 6:
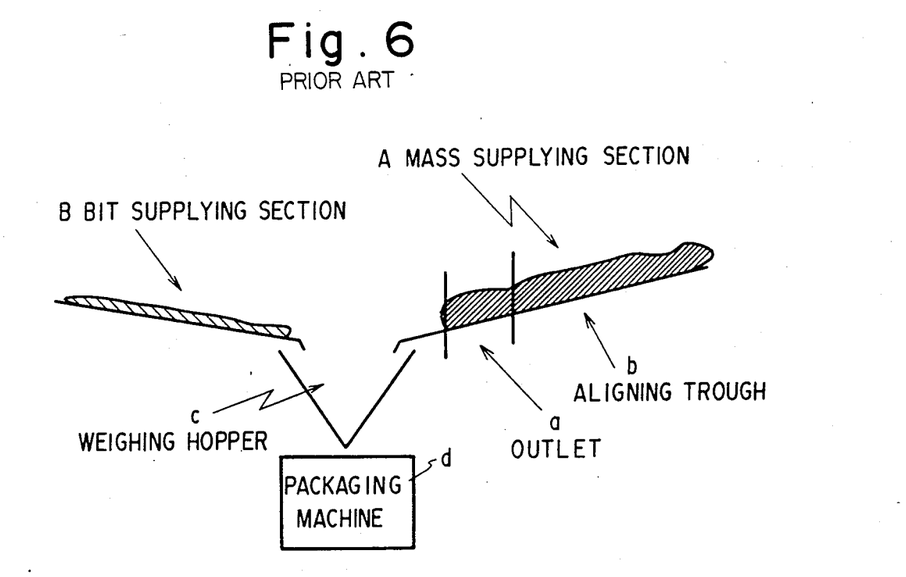
FIG. 6 is a schematic view of a conventional weighing apparatus.

Elongate articles such as dried macaroni, spaghetti, dried noodle strings have heretofore been weighed and packaged by a weighing apparatus as shown in FIG. 6 of the accompanying drawings. The elongate articles to be weighed, about 90% of a target weight, are supplied by a mass supplying section A into a weighing hopper c, and remaining articles, about 10% of the target weight, are supplied from a bit supplying section B into the weighing hopper c. When the sum of the weights of the articles supplied is equal to the target weight, the articles are delivered from the weighing hopper c to a packaging machine d in which they are packaged.

Since the articles are supplied from both of the mass and bit supplying sections A, B, it has been time-consuming to weigh the articles, and hence the weighing apparatus has a limited processing capability. With about 90% of the target weight supplied from the mass supplying section A, a constant quantity of articles have to be discharged from an outlet a, requiring a long aligning trough b which has made the weighing apparatus large in size.

SUMMARY OF THE INVENTION

Therefore, it is an object of the present invention to provide a weighing apparatus having a primary weighing machine for weighing articles up to a prescribed weight which is a percentage of a preset target weight and a plurality of secondary weighing machines for weighing a shortage with respect to the target weight, the secondary weighing machines being capable of combinatorial weighing operation for an increased processing capability to make the weighing apparatus small in size.

According to the present invention, a weighing apparatus for weighing elongate articles such as spaghetti strings or macaroni tubes, for example, includes a primary weighing machine for measuring the weight of articles within a preset target weight, a plurality of secondary weighing machines for measuring a weight shortage with respect to the preset target weight which is the difference between the preset target weight and the weight measured by the primary weighing machine, means for effecting a combinatorial weighing operation on the weights from the secondary weighing machines with the shortage employed as a combinatorial target weight to select one weight combination which is equal to the combinatorial target weight or closest thereto within an allowable range, and combining means for combining articles discharged from the primary weighing machine and those secondary weighing machines which give the weight combination. The articles discharged from the primary weighing machine and those secondary weighing machines which produce the weight combination are supplied to the combining means which may comprise a packaging machine.

The articles may be supplied from a single supply means to two primary weighing machines and also from a single supply means to two secondary weighing machines, and a combinatorial weighing operation may be effected on the weights from the secondary weighing machines with the shortage employed as a combinatorial target weight to find a proper weight combination which is equal to the combinatorial target weight or closest thereto within an allowable range. The articles discharged from the primary weighing machines and from those secondary weighing machines which give the proper weight combination are supplied to the packaging machine.

The combinatorial weighing operation is carried out with the paired secondary weighing machines supplied from the single supply means not being involved, and with only one pair of secondary weighing machines supplied from the single supply means being involved. When both of the secondary weighing machines in one pair are selected to give a proper weight combination and the articles are discharged from these secondary weighing machines, zeropoint adjustment is effected on one of the paired secondary weighing machines.

In addition, there is an automatic control means for keeping the number of secondary weighing machines discharging articles within a predetermined range in order to optimize the combination accuracy, thus solving various problems which have conventionally been caused by manual adjustment.

When a combination failure takes place among the secondary weighing machines, no articles are discharged from and additionally supplied to the secondary weighing machines, and a bucket is moved one pitch or interval to prevent the articles supplied only from the primary weighing machine and contained in the bucket from being charged from the bucket into the packaging machine. With this arrangement, the weighing efficiency can be increased without stopping operation of the weighing apparatus.

The primary weighing machine and the plurality of secondary weighing machines are employed together, and the combinatorial weighing operation is performed on the weights from the secondary weighing machines, so that articles of the target weight can be found by the primary weighing machine and the secondary weighing machines. When a new target weight is set or the target value is changed, the shutter width of a supplying device which supplies articles to the primary weighing machine based on a preset weight value is automatically set to increase the processing ability.

The primary weighing machines for weighing a predetermined quantity of articles with respect to the preset target weight, and the plurality of secondary weighing machines for weighing a shortage with respect to the target weight are employed together, and the articles may be supplied from a single supply means to two primary weighing machines and also from a single supply means to two secondary weighing machines. Therefore, the number of supply means may be half of the number of the weighing machines, resulting in a smaller size of the weighing apparatus. Most of the articles are weighed by the primary weighing machines, and a shortage of the articles with respect to the target weight is weighed by the secondary weighing machines. Since the amount of articles weighed by each of the secondary weighing machines is small, the time required to supply and weigh the articles in the secondary weighing machines is shortened, and the processing ability is increased. The combinatorial weighing operation of the secondary weighing machines is effected with the paired secondary weighing machines supplied from the single supply means not being involved, and with only one pair of secondary weighing machines supplied from the single supply means being involved. When both of the secondary weighing machines in one pair are selected to give a proper weight combination and the articles are discharged from these secondary weighing machines, zero-point adjustment is effected on one of the paired secondary weighing machines. Thus, zero-point adjustment can be performed without stopping the weighing apparatus, and uniformly on all of the secondary weighing machines, not on particular secondary weighing machines.

The number of secondary weighing machines having discharged articles is computed at all times, and is checked to determine the average number per a predetermined number of weighing cycles. The amount of articles supplied to the primary and secondary weighing machines is controlled to keep the number of secondary weighing machines having discharged articles within a prescribed range. As a consequence, the articles can be weighed while the combination accuracy is optimized automatically at all times.

When any combinatorial weighing operation fails, the discharge of articles from the secondary weighing machines is inhibited, and the articles discharged from the primary weighing machine are not packaged. Thus, articles can successively be weighed without stopping the weighing apparatus operation, resulting in an increased degree of weighing efficiency. When a target weight is set, the shutter width is automatically set according to the target weight thus set. Consequently, the shutter width is not required to be automatically adjusted.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
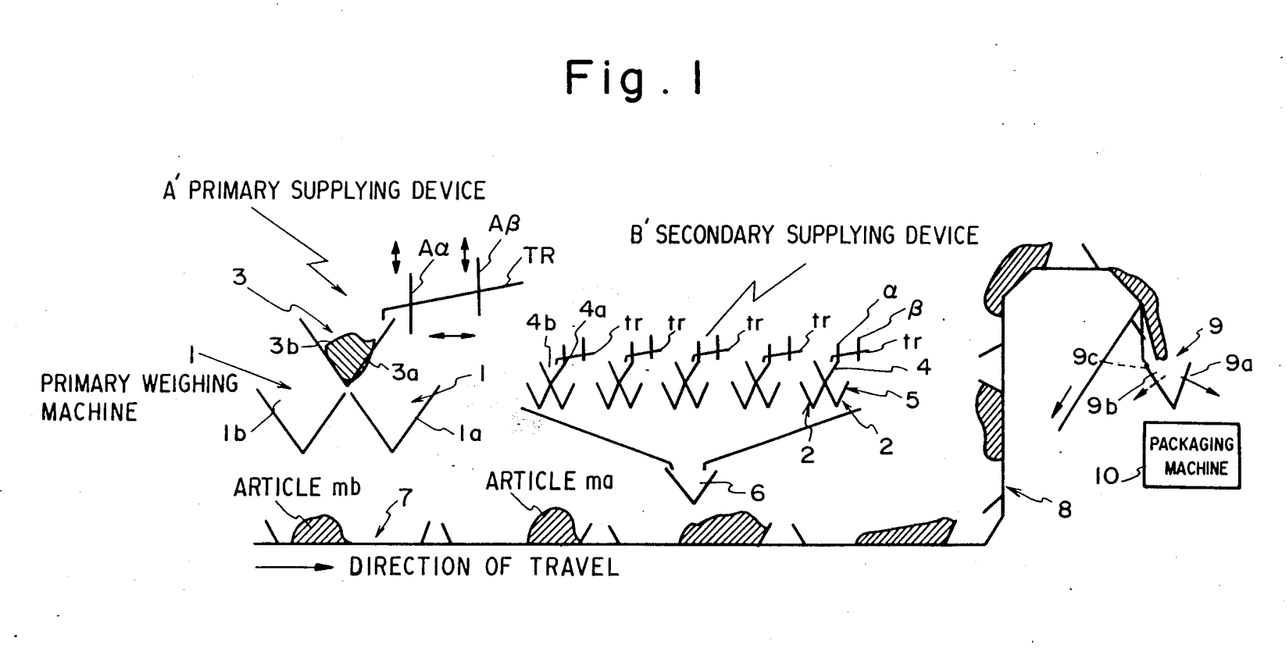
FIG. 1 is a schematic view of a weighing apparatus according to the present invention.

FIG. 1 schematically shows a weighing apparatus according to the present invention. The weighing apparatus has a primary supplying device A' having a single elongate primary trough TR provided with primary shutters A$\alpha$, A$\beta$ movable vertically in the directions of the arrows for supplying elongate articles such as spaghetti strings into a primary pool hopper 3. One of the gates 3a, 3b of the primary pool hopper 3 is open for supplying the elongate articles to one of primary weighing hoppers 1a, 1b. The primary shutter A$\alpha$ is also movable horizontally in the directions of the arrow in order to vary the shutter width. Two primary weighing machines 1 are disposed below the primary pool hopper 3 for receiving articles from the gates 3a, 3b, respectively. Each of the primary weighing machines 1 is composed of a single primary weighing hopper and a single weight sensor (not shown). Articles ma, mb weighed respectively by the primary weighing machines 1 having the respective primary weighing hoppers 1a, 1b are discharged into buckets 7 and delivered by a bucket conveyor 8.

Five secondary supplying devices B' are located downstream of the primary supplying device A' in the direction of travel of the bucket conveyor 8. The secondary supplying devices B' have respective elongate troughs tr each having secondary shutter $\alpha$, $\beta$ movable vertically for supplying elongate articles such as spaghetti strings into respective secondary pool hoppers 4. Each secondary pool hopper 4 opens its gate 4a or 4b to supply the articles to an associated secondary weighing machine 2 composed of a single weighing hopper 5 and a single weighing hopper (not shown). There are ten secondary weighing machines 2.

Each of the primary weighing machines 1 is supplied with a substantially constant quantity of articles the weight of which is smaller than a preset target weight, for detecting the weight of the articles. A shortage of the articles with respect to the target weight can be supplied by the secondary weighing machines 2. In particular, the ten secondary weighing machiens 2 effect a combinatorial weighing operation, and the articles are discharged from the secondary weighing hoppers 5 of those secondary weighing machines 2 which give an optimum weight combination into a timing hopper 6. When the articles ma, for example, weighed by the primary weighing machine 1 and discharged into the bucket 7 reach the position of the timing hopper 6, the timing hopper 6 is opened to discharge the articles from the secondary weighing machines 2 into the bucket 7. The combined articles are then delivered by the bucket conveyor 8 to a distribution hopper 9. If the articles in the bucket 7 have a proper weight in view of the preset target weight, then a proper-weight gate 9a is opened to supply the articles to a packaging machine 10 in which they are packaged. If the articles in the bucket 7 do not have a proper weight or have a failure weight, then a failure-weight gate 9b is opened to reject the articles in the bucket 7.

Figure 2:
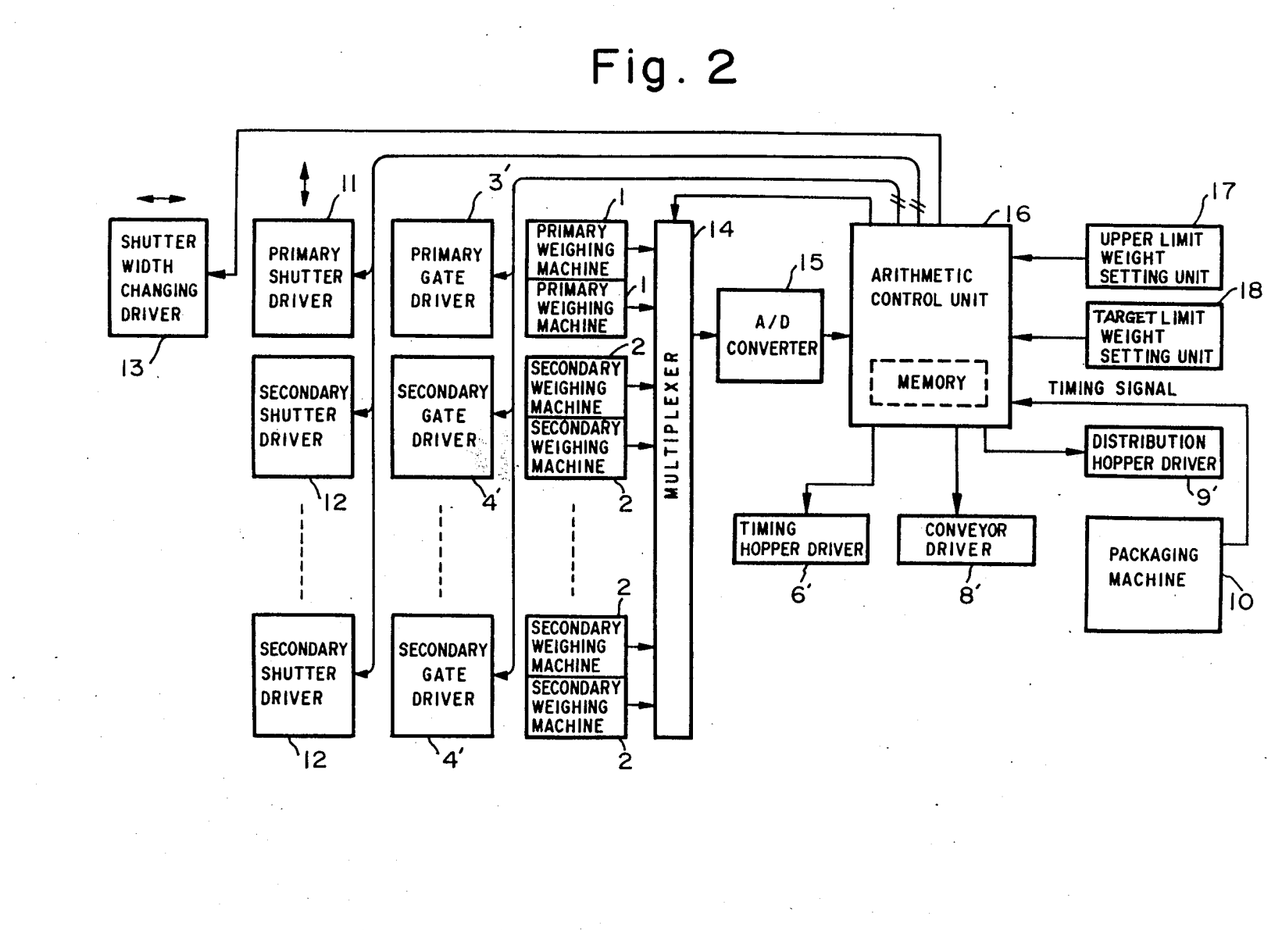
FIG. 2 is a block diagram of the weighing apparatus of the invention.

FIG. 2 shows in a block form the weighing apparatus according to the present invention. An arithmetic control unit 16 comprising a microcomputer, for example, issues a signal for actuating a primary shutter driver 11 to drive the primary shutters A$\alpha$, A$\beta$ for supplying the articles to the primary pool hopper 3. Then, the arithmetic control unit 16 issues a signal to actuate a primary gate driver 3' for opening one of the gates 3a, 3b of the primary pool hopper 3 to supply the articles into the corresponding primary weighing hopper which weighs the articles. When a timing signal is fed from the packaging machine 10 to the arithmetic control unit 16, the weight measured by the primary weighing machine is fed via a multiplexer 14 and an A/D converter 15 to the arithmetic control unit 16 in which the weight is stored in a prescribed area in a memory. The arithmetic control unit 16 issues a switching signal to the multiplexer 14 to successively receive the weights from the secondary weighing machines 2, the weights being delivered through the A/C converter 15 to the arithmetic control unit 16 in which the weights are stored in prescribed areas in the memory. The arithmetic control unit 16 computes a combinatorial target weight for the secondary weighing machines 2 based on the target weight set by a target weight setting unit 18 and the weight given from the primary weighing machine 1, and then effects a combinatorial weighing operation for the secondary weighing machines 2. An upper limit weight setting unit 17 presets an upper limit weight deviation from the preset target weight. For example, if the target weight is 500 g and the upper limit weight is 505 g, then the deviation of 5 g is set in the upper limit weight setting unit 17. The upper limit weight deviation has been supplied in advance to the arithmetic control unit 16 from the upper limit weight setting unit 17. The arithmetic control unit 16 then selects, as a proper weight combination, a weight combination which is equal to the combinatorial target weight within the upper limit weight deviation, or a weight combination which is closest to the combinatorial target weight. In selecting the proper weight combination, those secondary weighing machines which are paired and supplied with the articles from the same secondary pool hopper and which are selected as giving a proper combination, are precluded from the combinatorial weighing operation, and the paired secondary weighing machines among the remaining secondary weighing machines are excluded from the combinatorial weighing operation. Therefore, the paired secondary weighing machines are prevented from discharging the articles at the same time. When there are no paired secondary weighing machines selected as giving a proper weight combination in the preceding weighing cycle, the two secondary weighing machines in each pair do not participate simultaneously in the combinatorial weighing operation, and only the two secondary weighing machines in one pair participate simultaneously in the combinatorial weighing operation in the present weighing cycle. This process performs zero-point adjustment for one of the paired secondary weighing machines which have discharged the articles, so that zero-point adjustment can be effected uniformly on all of the secondary weighing machines, not on certain secondary weighing machines. With a proper weight combination found, the articles are discharged from those secondary weighing machines which are selected to give such a proper weight combination, into the timing hopper 6. The arithmetic control unit 16 detects when the bucket 7 supplied with the articles weighed by the primary weighing machine and delivered by the bucket conveyor 8 reaches the position below the timing hopper 6, the arithmetic control unit 16 issues a signal to a timing hopper driver 6' to discharge the articles therefrom into the bucket 7.

The articles in the bucket 7 are charged into the distribution hopper 9. If the articles in the bucket 7 are of a proper weight, then a signal indicative of opening of the gate 9a is fed from the arithmetic control unit 16 to a distribution hopper driver 9'. If the articles in the bucket 7 are of an improper or failure weight, then a signal inidicative of opening of the gate 9b is fed from the arithmetic control unit 16 to the distribution hopper driver 9'. The articles discharged from the proper-weight gate 9a are packaged by the packaging machine 10, and the articles discharged from the failure-weight gate 9b are returned to the primary supplying device A' or the secondary supplying device B'.

A conveyor driver 8' is controlled by a signal from the arithmetic control unit 16 to feed the bucket conveyor 8 intermittently at a prescribed speed.

The secondary gates are actuated by a secondary gate driver 4', the secondary shutters are actuated by a secondary shutter driver 12, and the shutter width is varied by a shutter width changing driver 13.

Figure 3:
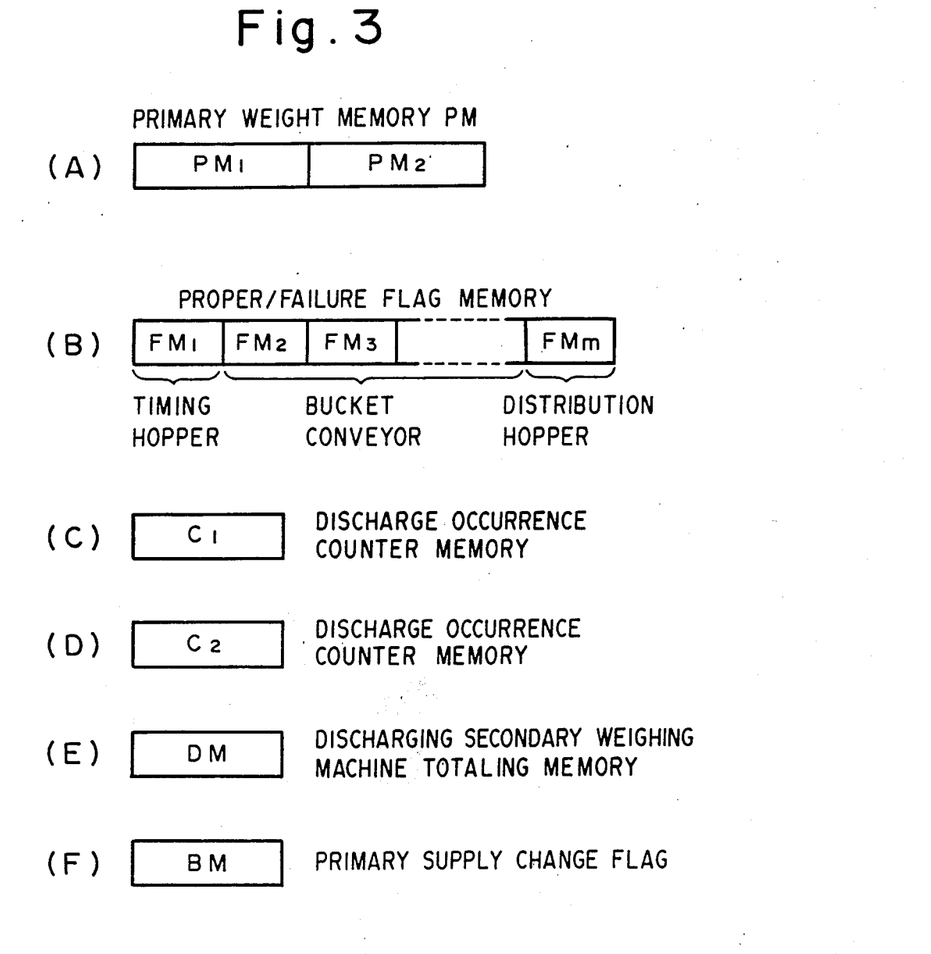
FIG. 3 is a diagram showing memories.

FIG. 3 shows the memory in the arithmetic control unit 16 in greater detail. FIG. 3(A) illustrates a primary weight memory PM for storing the weights from the primary weighing machines 1. The primary weight memory PM comprises an area PM1 for storing the weight of articles discharged in a present cycle from the primary weighing hopper 1a or 1b, and an area PM2 for storing the weight of articles discharged in a preceding cycle from the primary weighing hopper. FIG. 3(B) shows a proper/failure flag memory FM for storing data indicative of whether a proper weight combination or an improper or failure weight combination is obtained as a result of a combinatorial weighing operation effected by the secondary weighing machines 2. The proper/failure flag memory FM is composed of an area FM1 for storing data indicative of whether the articles discharged from the timing hopper 6 have a proper weight or a failure weight, areas FM2, FM3, . . . for storing data indicative of whether the articles in the respective buckets 7 delivered by the bucket conveyor 8 have proper or failure weights, and an area FMm for storing data indicative of whether the articles charged into the distribution hopper 9 have a proper weight or a failure weight. FIGS. 3(C) and 3(D) are illustrative of discharge occurrence counter memories C1, C2 for counting the occurrence of discharges from the secondary weighing machines 2. FIG. 3(E) shows a memory for counting the total of secondary weighing machines 2 having discharged the articles. FIG. 3(F) is a primary supply change flag for the primary weighing machines 1 as described later on.

Figure 4:
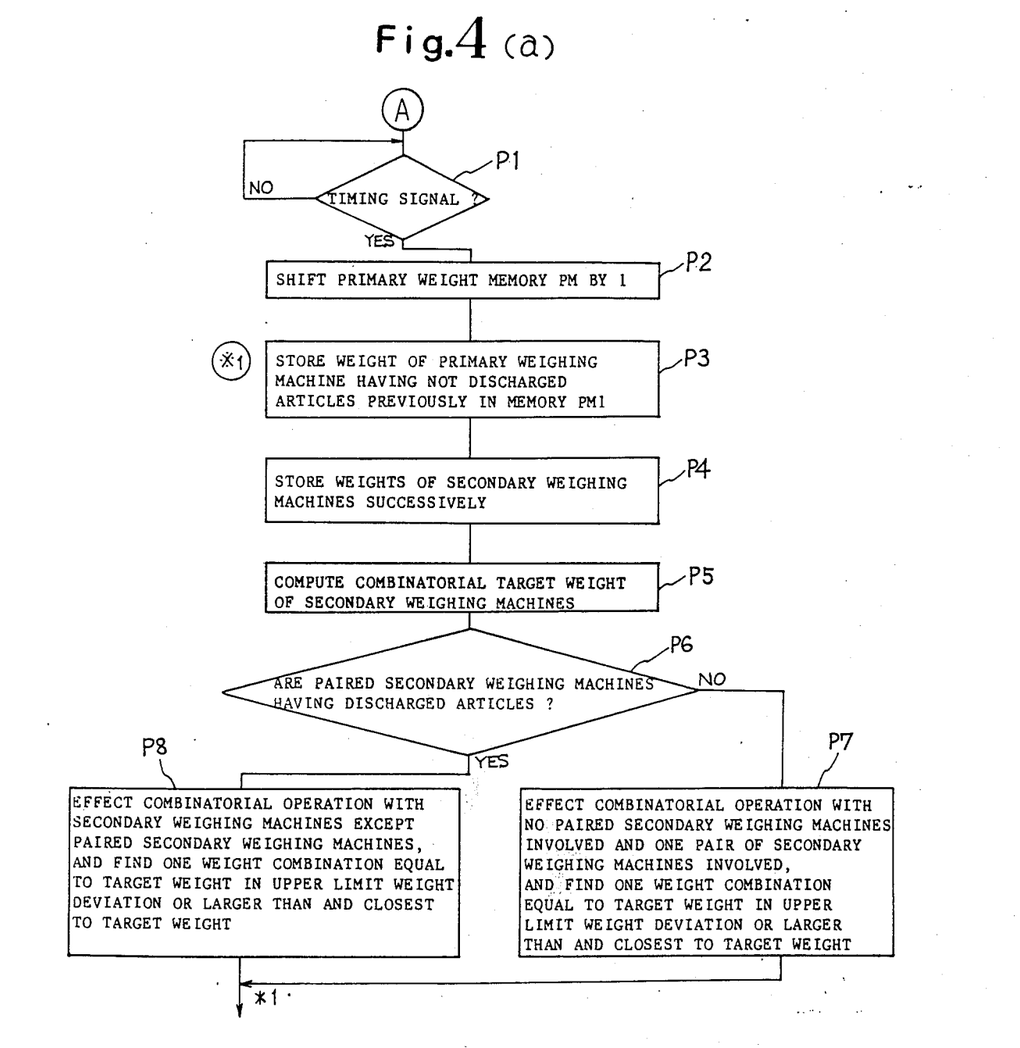
FIGS. 4(a), 4(b) and 4(c) are a flowchart of operation of the weighing apparatus.
Figure 4B:
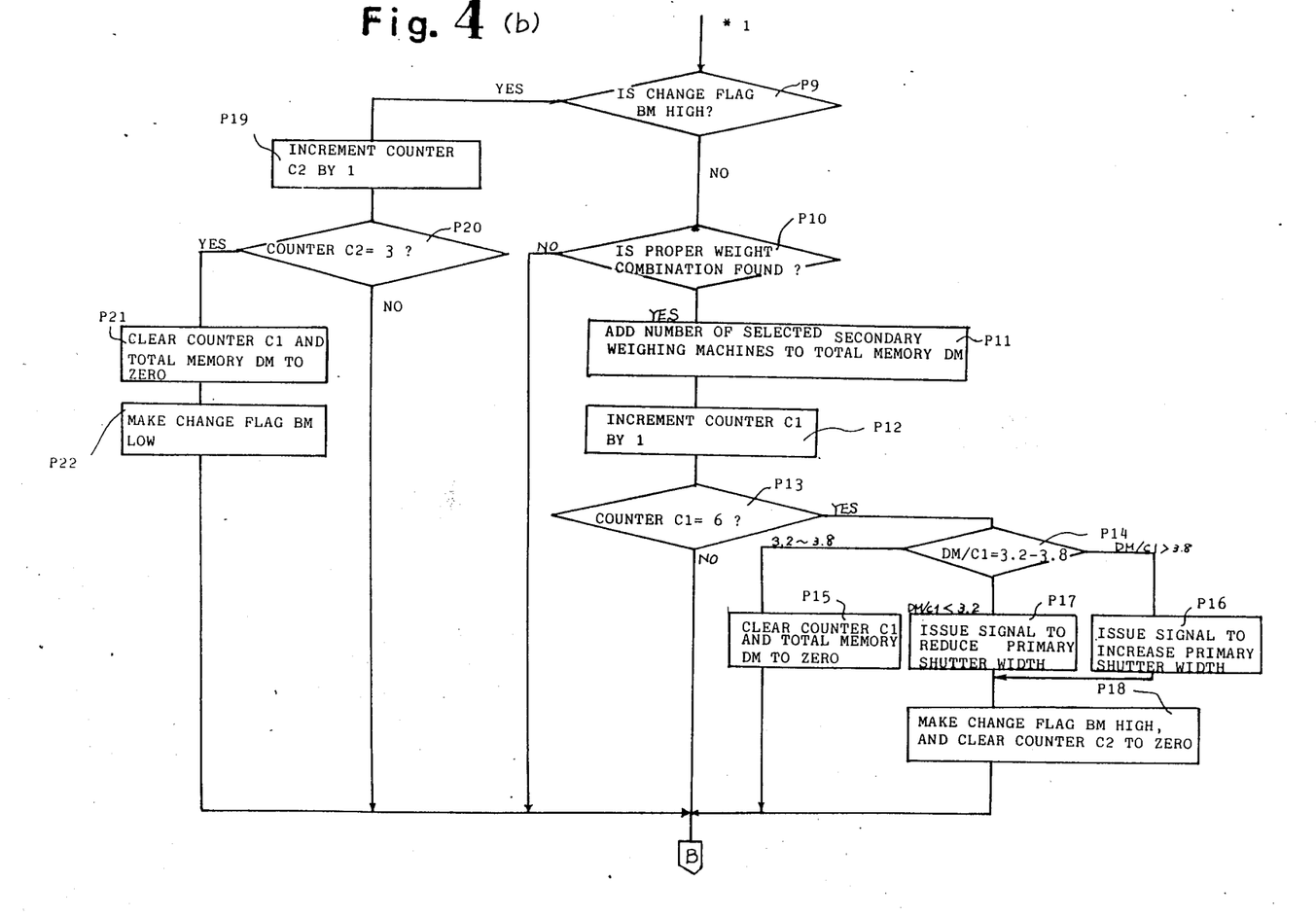
Figure 4C:
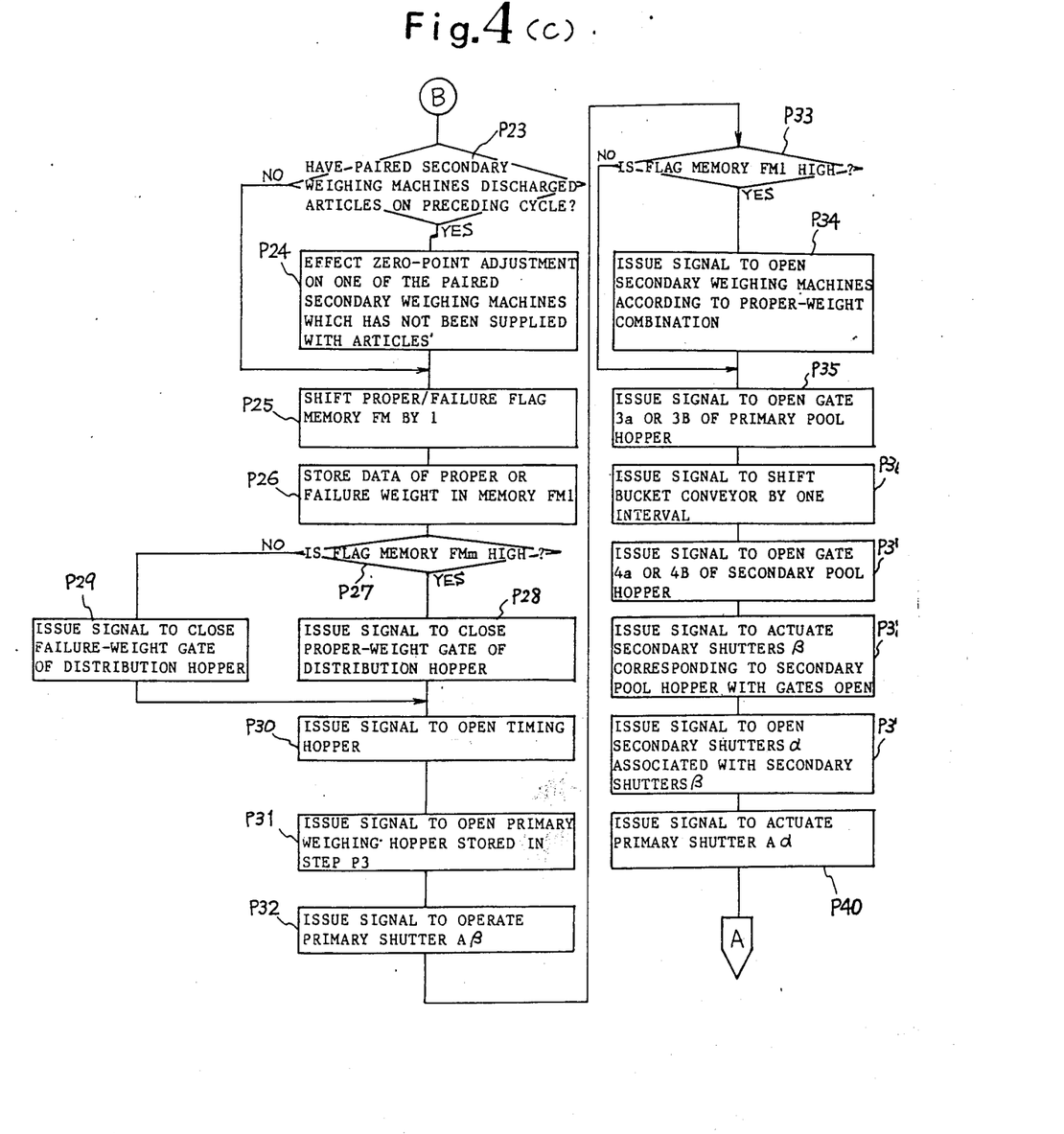

FIG. 4 is a flowchart of operation of the weighing apparatus. Operation of the weighing apparatus will be described with reference to FIG. 4.

(1) When a timing signal from the packaging machine 10 is detected in a step P1, the data in the primary weight memory PM is shifted by 1 in a step P2. This means that if the weight of the articles discharged from the primary weighing hopper 1a in the previous weighing cycle is stored in the memory area PM1, then the stored weight is shifted from the memory area PM1 to the memory area PM2. Then, the weight of the articles in the primary weighing machine from which they have not been discharged in the previous cycle, i.e., the articles in the primary weighing machine having the primary weighing hopper 1b is stored in the memory area PM1 in a step P3.

(2) Thereafter, the weights from the secondary weighing machines 2 are successively stored in memory areas (not shown) in a step P4. The arithmetic control unit 16 determines a combinatorial target weight for the secondary weighing machines 2 by subtracting the weight stored in the primary weight memory PM2, i.e, the weight of the articles discharged from the primary weighing machine 1 in the previous cycle, from the target weight preset by the target weight setting unit 18 in a step P5. Then, the control unit 16 checks whether the articles are simultaneously discharged from the paired secondary weighing machines 2 in the preceding cycle in a step P6. If there are no paired secondary weighing machines having simultaneously discharged the articles in the preceding cycle, then a combinatorial weighing operation in which the two secondary weighing machines in each pair are not simultaneously involved, and a combinatorial weighing operation in which the two secondary weighing machines in only one pair are simultaneously involved, are carried out to find a single weight combination (proper weight combination) which is equal to the combinatorial target weight within the upper limit weight deviation or greater than and closest to the combinatorial target weight in a step P7. If there are paired secondary weighing machines having simultaneously discharged their articles in the preceding cycle, then a combinatorial weighing operation is effected among the secondary weighing machines other than those paired secondary weighing machines to find a single weight combination (proper weight combination) which is equal to the combinatorial target weight within the upper limit weight deviation or greater than and closest to the cobminatorial target weight in a step P8. Subsequently, the control unit 16 checks whether the primary supply changing flag is high or not in a step P9. Since the amount of articles discharged from the primary weighing machines is not changed at this stage, control goes on to a step P10 which checks to see if a proper weight combination has been found.

(3) If the proper weight combination has been determined, then the number of the selected secondary weighing machines 2 is added and stored in the total memory DM in a step P11. Then, the discharge occurrence memory C1 is incremented by 1 in a step P12. A step P13 checks to see if the count of the counter C1 has reached a prescribed number, such as "6". The steps following B are repeated until the prescribed number is reached by the counter C1. If the count of the counter C1 has reached the prescribed number, then a step P14 determines whether the value of DM/C1 which is obtained by dividing the value of the total memory DM by the count of the counter C1 is within a prescribed range such as from 3.2 to 3.8. The range of 3.2 to 3.8 is selected because experience indicates that if there are ten secondary weighing machines and combinatorial weighing operations are effected with no paired secondary weighing machines involved and with the two secondary weighing machines in only one pair involved, then the maximum number of secondary weighing machines capable of discharging their articles ranges from 5 to 6, and the best combinatorial weighing accuracy can be attained when the articles are discharged from half of those secondary weighing machines, i.e., 3 or 4 secondary weighing machines. Therefore, the step P14 checks to see if the average number of secondary weighing machines which have discharged the articles or have been selected per a predetermined number, for example 6. If the value of DM/C1 falls in the range of from 3.2 to 3.8, then the counter C1 and the total memory DM are cleared to zero in a step P15, and control goes on to B. If the value of DM/C1 is smaller than 3.2, then the average number of selected secondary weighing machines 2 is judged as being small. A signal for reducing the primary shutter width of the primary supplying device A' is issued to the shutter width changing driver 13 in a step P17 to reduce the interval between the primary shutters A$\alpha$, A$\beta$ by one pitch for thereby reducing the quantity of articles that can be supplied. The number of secondary weighing machines 2 which can be selected is therefore increased, and the primary supply change flag MB goes high, whereupon the discharge occurrence counter memory C2 is cleared to zero in a step P18. The discharge occurrence counter memory C2 serves as a memory for storing the occurrences of discharge until the articles in the primary pool hopper and the primary weighing hoppers are discharged. If the value of DM/C1 is greater than 3.8, then a signal for increasing the primary shutter width is issued in a step P16, and the primary supply change flag MB goes high, with the discharge occurrence counter memory C2 cleared to zero in the step P18.

(4) If the change flag BM is high in the step P9, i.e., then step P18 has been performed, then the count of the counter memory C2 is incremented by 1 in a step P19. Then the control unit 16 checks whether count of the counter memory C2 has reached "3" in a step P20 in order to prevent the total memory DM from being incremented until the articles are completely discharged from the primary pool hopper 3 and the primary weighing hoppers 1$a$, 1$b$ which have been supplied through the shutter width before it was changed (or until the articles are weighed three times). When the count of the counter memory C2 reaches "3", the counter C1 and the total memory DM are cleared to zero in a step P21, and the change flag BM is changed to be low in a step P22.

(5) A step P23 checks whether paired secondary weighing machines have simultaneously discharged articles in the previous cycle. If there are such paired secondary weighing machines in the previous cycle, then zero-point adjustment is performed on the one of the paired secondary weighing machines which has not been supplied with articles (in one weighing cycle, the articles are charged into the weighing hopper of only one of the paired secondary weighing machines 2 having simultaneously discharged their articles, and the weighing hopper of the other secondary weighing machine 2 remains empty) in a step P24. Then, the proper/failure flag memory FM is shifted by 1 as a whole in a step P25, and the data indicating whether the weight is proper or not as a result of the combinatorial weighing operation is stored in the memory area FM1 in a step P26. Specifically, if the proper weight combination is obtained, then a high signal is stored in the memory area FM1, and if the proper weight combination is not obtained, then a low signal is stored in the memory area FM1. Then, the control unit 16 determines whether the flag memory FMm is high or not, i.e., whether the articles in the distribution hopper have a proper weight or a failure weight in a step P27. If the flag memory FMm is high, then a signal for opening the proper-weight gate of the distribution hopper is issued in a step P28, and if the flag memory FMm is not high, then a signal for opening the failure-weight gate of the distribution hopper is issued in a step P29.

(6) Then, a timing hopper opening signal is issued in a step P30, and a signal for opening the primary weighing hopper of the primary weighing machine, the article weight of which has been stored in the step P3 (*1), is issued in a step P31 to discharge the articles into the bucket 7. Thereafter, a signal for operating the primary shutter A$\beta$ is issued in a step P32 to vertically move the primary shutter A$\beta$ for supplying the articles between the primary shutters A$\beta$, A$\alpha$. Control then checks whether the flag memory FM1 is high or not in a step P33. If FM1 is low, then the weight combination is not proper, and the secondary weighing hoppers are not opened, and the bucket 7, supplied only with the articles from the primary weighing machine, is intermittently delivered toward the distribution hopper 9 each time a shift signal is applied to the conveyor driver 8'. If FM1 is high, then the weight combination is proper, and a secondary weighing hopper opening signal is issued according to the proper-weight combination in a step P34 to cause the secondary weighing hoppers to discharge the articles into the timing hopper 6. A signal is then issued for opening the gate 3a or 3b of the primary pool hopper for the primary weighing machine which has discharged the articles in a step P35 to thereby charge the articles from the primary pool hopper 3 into the primary weighing hopper 1a or 1b. Thereafter, a signal is issued in a step P36 for shifting the bucket converyor 8 one interval, and a signal is issued for opening the gates 4a or 4b of the secondary pool hoppers 4 for the secondary weighing machine which have discharged the articles in a step P37 to thereby charge the articles from the secondary pool hoppers 4 into the secondary weighing hoppers. A signal for operating the secondary shutters β of the secondary supplying device B' which correspond to the secondary pool hoppers with their gates open is issued in a step P38 to vertically move the secondary shutters β to supply articles between the secondary shutters β, α. Then, a signal for operating the secondary shutters α associated with the actuated secondary shutters β is issued in a step P39 to supply those articles which are between the shutters β, α from the secondary supplying device B' into the pool hoppers 4. Finally, a signal for actuating the primary shutter Aα is issued to supply those articles which are between the primary shutters Aβ, Aα from the primary supplying device A' into the primary pool hopper 3 in a step P40. Then, control goes back to A. In the above embodiment, the shutter width of the primary supply device is adjusted to control the quantity of articles supplied to the primary weighing machines in order that the number of secondary weighing machines having discharged articles falls in a prescribed range. However, it is also possible to keep the quantity of articles supplied to and hence from the primary weighing machines constant, and to control the shutter width of the secondary supplying device with the shutter width changing driver 13 in order that the number of secondary weighing machines having discharged articles falls in a prescribed range.

Figure 5:
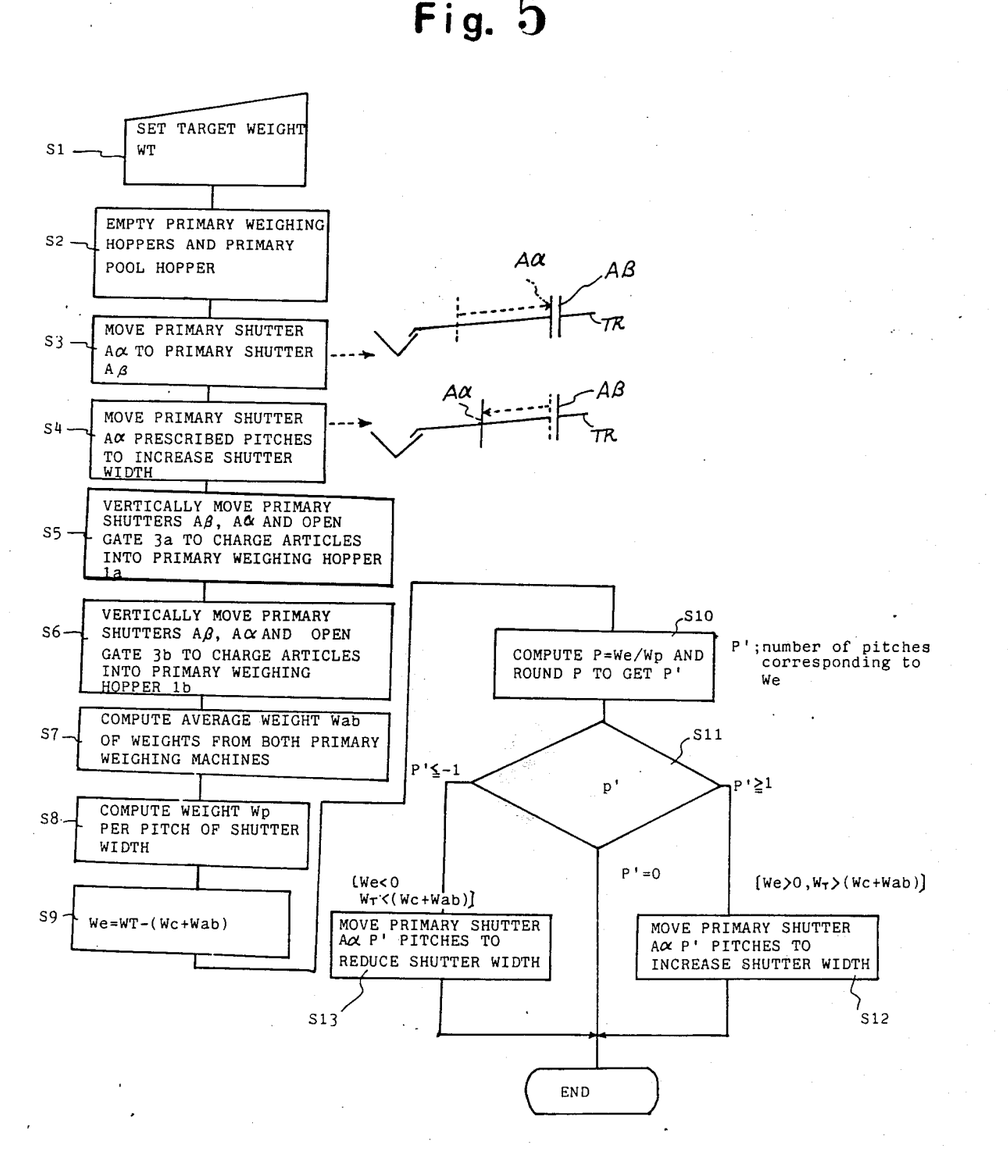
FIG. 5 is a flowchart of a process for automatically adjusting the width of a primary shutter.

When a target weight is newly set or the preset target weight is changed, the quantity of articles supplied to the primary weighing machines will be automatically adjusted according to the preset target weight. Such automatic adjustment will be described with reference to the flowchart of FIG. 5. In FIG. 5, a target weight is newly set, and the primary shutter width is automatically adjusted according to the new setting of the target weight.

(1) A target weight WT is set by the target weight setting unit 18 in a step S1. Then, with no articles present between the primary shutters Aα, Aβ, the primary weighing hoppers 1a, 1b and the primary pool hopper 3 are opened to empty these hoppers in a step S2. Thereafter, the primary shutter Aα is moved to the primary shutter Aβ in a step S3 as shown in FIG. 5 to determine a reference position, followed by moving the primary shutter Aα, a prescribed number pitches in the direction to increase the shutter width in a step S4.

(2) The primary shutter Aβ is first moved vertically to supply articles between the primary shutters Aβ, Aα, and then the primary shutter A α is moved vertically to supply the articles from between the primary shutters Aβ, Aα into the primary pool hopper 3, the gate 3a of which is opened to charge the articles into the primary weighing hopper 1a in a step S5. Likewise, the primary shutters Aα, Aβ are successively moved vertically to supply the articles into the primary pool hopper 3, the gate 3b of which is opened to charge the articles into the primary weighing hopper 1b in a step S6. Then, the data on the weights from both the primary weighing machines 1 are supplied to compute the average weight Wab in a step S7.

(3) Then, the weight Wp per pitch of the shutter width is determined by:

$$Wp = (Wab/\text{the number of pitches of shutter width})$$

The deviation weight We is determined in a step S9 by:

$$We = WT - (Wc + Wab)$$

where Wc is the prescribed weight to be measured by a prescribed number (3 or 4 for example) of secondary weighing machines. More specifically, the deviation weight We indicates the difference between the target weight WT and the weight which is the sum of the weight of the articles from the prescribed number of secondary weighing machines 2 and the average weight of the articles from the primary weighing machines 1 which have been supplied through the present primary shutter width (having the pitches in the step S4). The primary shutter width is adjusted in the successive steps (below) in order to eliminate or nearly eliminate the deviation weight We. P=(We/Wp) is computed from the weights We, Wp as defined above, and a value P' is obtained by rounding the value P to an integer in a step S10. The value P' corresponds to the number of pitches of the shutter width corresponding to We.

(4) The value P' is checked in a step S11. If $P' \geq 1$, then We >0 and WT>(Wc+Wab). At this time, the primary shutter Aα is moved P' pitches in the direction to increase the shutter width in a step S12. If $P' \leq -1$, then We<0 and WT<(Wc+Wab). At this time, the primary shutter Aα is moved P' pitches in the direction to reduce the shutter width in a step S13. The primary shutter width is not varied if P'=0.

Although a certain preferred embodiment has been shown and described, it should be understood that many changes and modifications may be made therein without departing from the scope of the appended claims.

What I claim is:
1. A weighting apparatus, comprising:
a plurality of primary weighing machines for measuring the weight of articles within a preset target weight;
single primary supply means, having a plurality of adjustable primary shutters, for supplying an adjustable amount of articles to said primary weighing machines;
a plurality of pairs of secondary weighing machines for measuring a weight shortage with respect to the preset target weight which is the difference between the preset target weight and the weight measured by said primary weighing machines,
single secondary supply means, having a plurality of shutters associated with each of said pairs of secondary weighing machines, for supplying articles to said pairs of secondary weighing machines;
means for operating the shutters of said secondary supply means;
means for effecting a combinatorial weighing operation on the weights from said secondary weighing machines with said shortage employed as a combinatorial target weight to select one weight combination which is equal to said combinatorial target weight of closest thereto within an allowable range;

combining means for combining articles discharged from said primary weighing machines and those secondary weighing machines which give said weight combination;

means for determining a value obtained by dividing the total number of selected secondary weighing machines by the number of proper-weight combinations executed by the secondary weighing machines when the number of the proper-weight combinations reaches a predetermined number, and for issuing a signal to adjust the primary shutters of said primary supply means when the value does not fall within a predetermined range; and adjusting means for adjusting the primary shutters of said primary supply means in response to said signal.

2. A weighing apparatus according to claim 1, wherein said combining means comprises means for packaging the articles.

3. A weighing apparatus according to claim 2, including means for finding one proper-weight combination which is equal to said combinational target weight or closest thereto within the allowable range, said packaging means being operable to package those articles which are selected by said finding means.

4. A weighing apparatus according to claim 1, including means for finding one proper-weight combination which is equal to said combinatorial target weight or closest thereto within the allowable range.

5. A weighing apparatus according to claim 1, wherein the number of secondary weighing machines to be selected is controlled so as to be within a prescribed range.

6. A weighing apparatus according to claim 5, wherein the number of secondary weighing machines to be selected is substantially half of the maximum number of secondary weighing machines capable of discharging the articles.

7. A weighing apparatus according to claim 5, wherein said primary weighing machine is supplied with a substantially constant quantity of articles, the quantity of articles supplied to the secondary weighing machines being controlled so that the average number of secondary weighing machines which discharge articles falls within a prescribed range.

8. A weighing apparatus according to claim 1, wherein the number of the secondary weighing machines having discharged the articles in weighing cycles are added to determine the average number of secondary weighing machines having discharged the articles in a predetermined number of weighing cycles, the supply of articles to said primary weighing machine being controlled according to said average number.

9. A weighing apparatus according to claim 1, including means for automatically adjusting the quantity of articles to be supplied to said primary weighing machine according to a target weight when the latter target weight is newly set.

10. A weighing apparatus according to claim 1, wherein only one of said secondary weighing machines in each pair is selected at a time.

11. A weighing apparatus according to claim 1, including means for selecting both of the secondary weighing machines in only one pair and effecting zero-point adjustment on one of the selected secondary weighing machines in a next weighing cycle when effecting a combinatorial weighing operation on the weights from said secondary weighing machines with said shortage employed as a combinatorial target weight to select one weight combination which is equal to said combinatorial target weight or closest thereto within an allowable range.

12. A weighing apparatus, comprising:

primary weighing means, including primary weighing machines, for providing a primary weight from the primary weighing machines less than a target weight;

secondary weighing means, including secondary weighing machines, for providing a combinatorial secondary weight of articles from the secondary weighing machines that is the closest weight to the difference between the target weight and the primary weight; and supply adjustment means for adjusting an amount of articles supplied to either said primary weighing means or said secondary weighing means to maintain an average number of respective weighing machines in each combination within a predetermined range.

* * * * *

UNITED STATES PATENT AND TRADEMARK OFFICE
CERTIFICATE OF CORRECTION

PATENT NO. : 4,669,557
DATED : June 2, 1987
INVENTOR(S) : Yukio Nakagawa

It is certified that error appears in the above-identified patent and that said Letters Patent is hereby corrected as shown below:

Column 2, line 16, change "zeropoint" to --zero-point--.

Column 10, line 45, change "weighting" to --weighing--.

Column 11, line 1, change "of" to --or--.

Signed and Sealed this

Fifteenth Day of December, 1987

Attest:

DONALD J. QUIGG

Attesting Officer      Commissioner of Patents and Trademarks